US010565570B2

(12) United States Patent
Chan et al.

(10) Patent No.: US 10,565,570 B2
(45) Date of Patent: Feb. 18, 2020

(54) PROCESSING NETWORK ARCHITECTURE WITH COMPANION DATABASE

(71) Applicant: The Toronto-Dominion Bank, Toronto (CA)

(72) Inventors: Paul Mon-Wah Chan, Toronto (CA); Perry Aaron Jones Haldenby, Toronto (CA); John Jong Suk Lee, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 547 days.

(21) Appl. No.: 15/277,540

(22) Filed: Sep. 27, 2016

(65) Prior Publication Data

US 2018/0089641 A1    Mar. 29, 2018

(51) Int. Cl.
*G06Q 20/06* (2012.01)
*G06Q 20/20* (2012.01)
*G06Q 20/40* (2012.01)
*G06Q 40/02* (2012.01)
*G06Q 40/06* (2012.01)

(52) U.S. Cl.
CPC ....... *G06Q 20/0655* (2013.01); *G06Q 20/202* (2013.01); *G06Q 20/4037* (2013.01); *G06Q 40/02* (2013.01); *G06Q 40/06* (2013.01); *G06Q 2220/00* (2013.01)

(58) Field of Classification Search
USPC ........................................................ 705/21
See application file for complete search history.

(56) References Cited

U.S. PATENT DOCUMENTS

| 6,081,792 | A  | 6/2000 | Cucinotta et al. |
| 6,249,866 | B1 | 6/2001 | Brundrett et al. |
| 6,874,089 | B2 | 3/2005 | Dick et al. |
| 6,986,043 | B2 | 1/2006 | Andrew et al. |
| 7,082,534 | B2 | 7/2006 | Tardo |

(Continued)

FOREIGN PATENT DOCUMENTS

| WO | WO 2014/201059 A1 | 12/2014 |
| WO | WO 2015/171580 A1 | 11/2015 |

OTHER PUBLICATIONS

Murray, Art, "All aboard the blockchain express", KM World, vol. 24.4, pp. 18, 22, Mar. 31, 2015.

(Continued)

*Primary Examiner* — Garcia Ade
(74) *Attorney, Agent, or Firm* — Duane Morris LLP

(57) ABSTRACT

A system comprises a non-transitory machine readable storage medium storing instructions and a database identifying a plurality of assets and a state of each asset. The instructions configure a processor for receiving updates to a distributed electronic ledger managed by plural peer processors. Each update includes an event or change affecting one of the assets. The peer processors verify portions of the ledger describing each event or change. At least one of the updates has not yet been recorded in the ledger at a time of the receiving. The processor computes a state of each asset, based on the updates, receives a request for a state of one of the assets; and responds to the request, reflecting each event and change affecting that asset. The response is performed without waiting for the peer processors to verify an update that has not yet been recorded in the ledger.

23 Claims, 11 Drawing Sheets

(56) References Cited

U.S. PATENT DOCUMENTS

| | | | |
|---|---|---|---|
| 8,285,967 B1 | 10/2012 | Veeraswamy et al. | |
| 8,295,489 B2 | 10/2012 | Sung et al. | |
| 8,416,954 B1 | 4/2013 | Raizen et al. | |
| 8,510,552 B2 | 8/2013 | De Atley et al. | |
| 8,788,842 B2 | 7/2014 | Brouwer et al. | |
| 2005/0213751 A1 | 9/2005 | Apostolopoulos | |
| 2007/0125840 A1* | 6/2007 | Law | G06Q 20/10 235/379 |
| 2011/0029370 A1 | 2/2011 | Roeding et al. | |
| 2011/0178926 A1 | 7/2011 | Lindelsee et al. | |
| 2013/0042112 A1 | 2/2013 | Spector | |
| 2014/0156529 A1 | 6/2014 | Pinault | |
| 2014/0244500 A1 | 8/2014 | Elias | |
| 2014/0344015 A1 | 11/2014 | Puertolas-Montanes et al. | |
| 2015/0081566 A1 | 3/2015 | Slepinin | |
| 2015/0081567 A1* | 3/2015 | Boyle | G06Q 20/3829 705/71 |
| 2015/0206106 A1* | 7/2015 | Yago | G06Q 20/0658 705/68 |
| 2015/0220928 A1 | 8/2015 | Allen | |
| 2015/0227922 A1 | 8/2015 | Filler | |

OTHER PUBLICATIONS

Swan, Melanie, *"Blockchain: Blueprint for a New Economy"*, O'Reilly Media, Inc., Feb. 8, 2015, 130 pages.

Peters, Gareth W. et al., "Understanding Modern Banking Ledgers through Blockchain Technologies: Future of Transaction Processing and Smart Contracts on the Internet of Money", ArXiv, Nov. 18, 2015, 33 pages.

\* cited by examiner

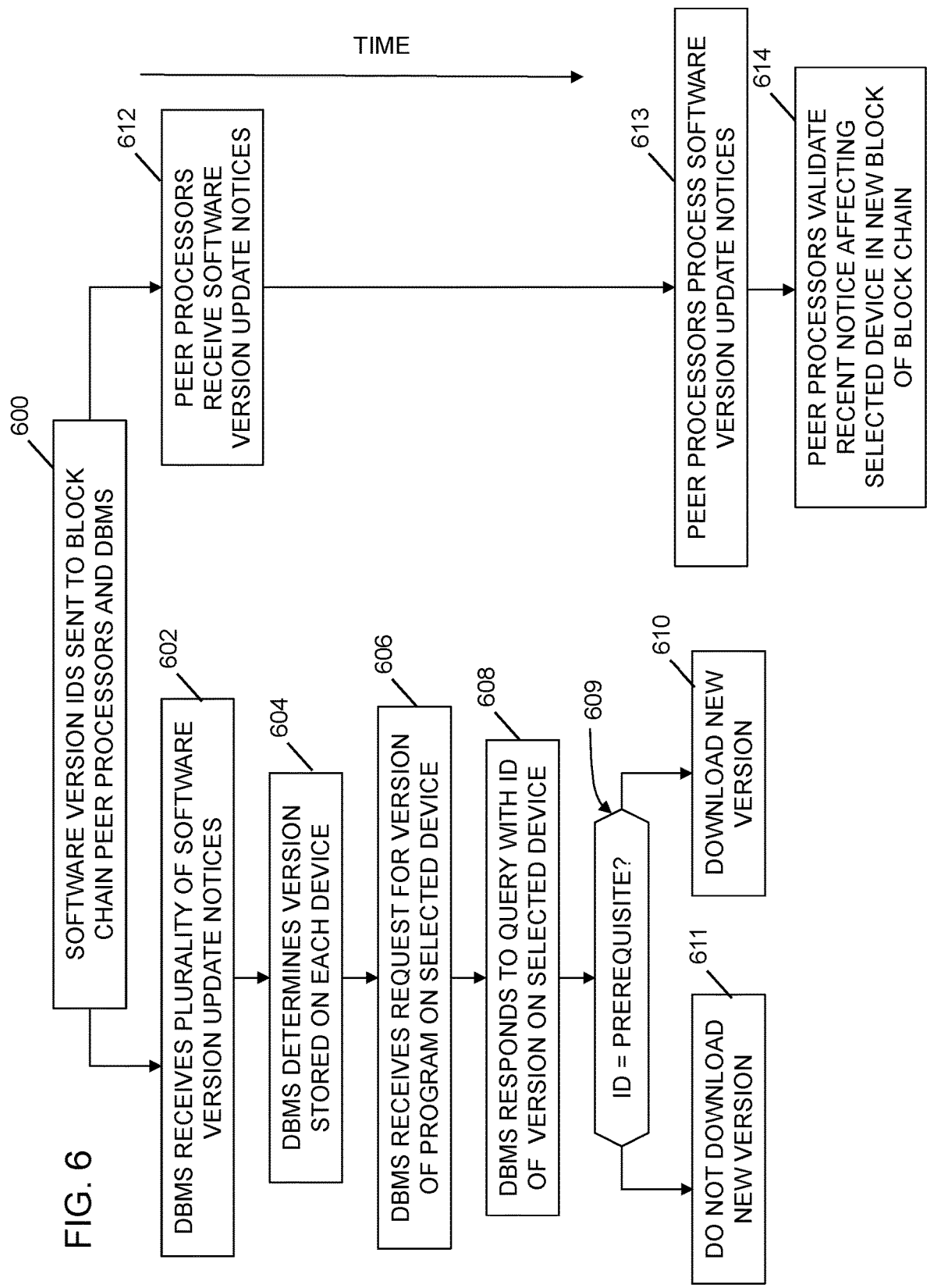

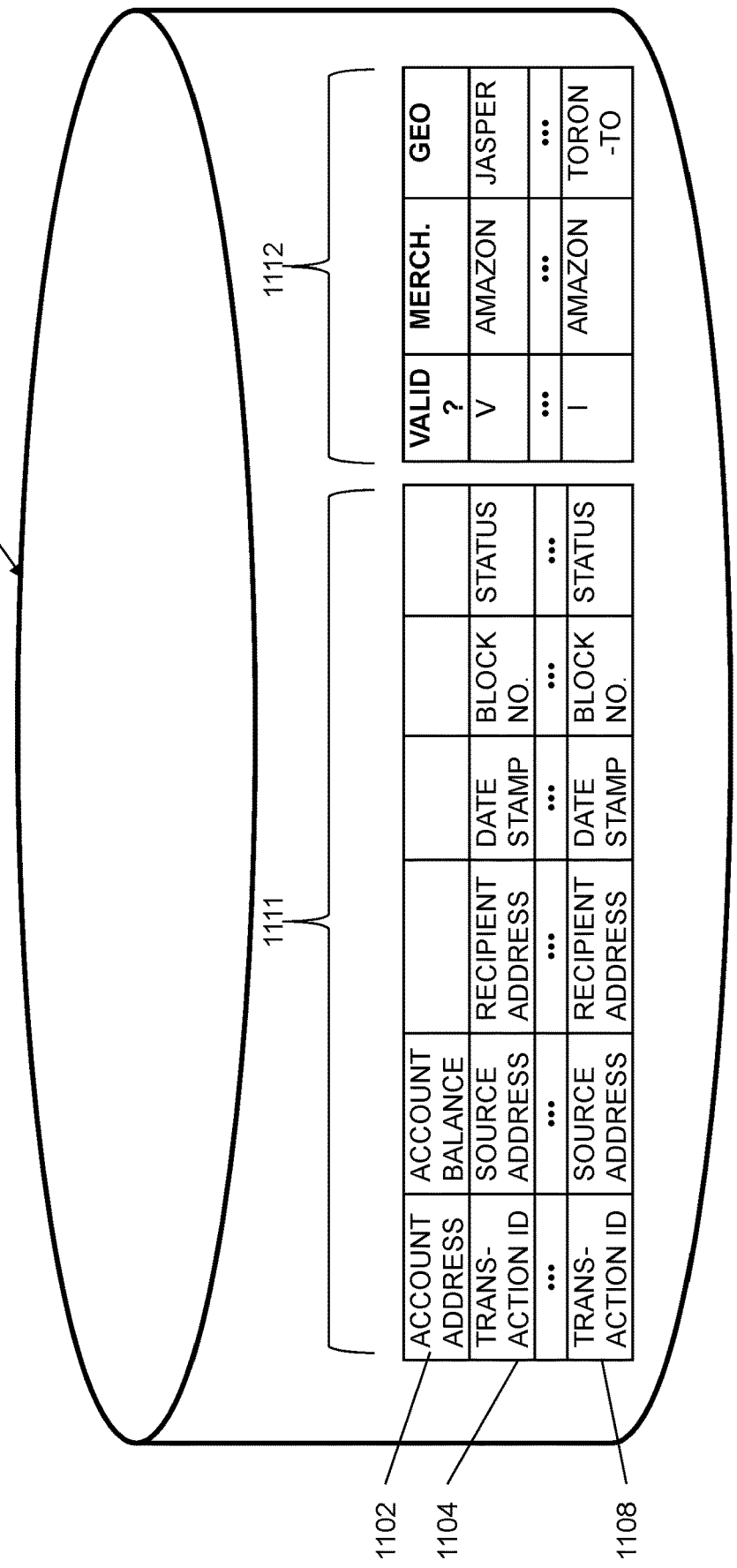

US 10,565,570 B2

PROCESSING NETWORK ARCHITECTURE WITH COMPANION DATABASE

FIELD

This disclosure relates generally to improvements in computer related technology.

BACKGROUND

Distributed electronic ledgers, such as block chains, have generated interest in a variety of fields as a decentralized data storage mechanism with reliable redundant validation.

A block chain includes a distributed database comprising blocks of data records (e.g., transaction records). Each block has a timestamp and a hash of the immediately preceding block. Blocks record and confirm valid transactions. Users known as miners perform proof-of-work in the course of generating the blocks. The amount of time needed to perform the proof-of-work can introduce significant delays between the time a valid transaction is first received by one of the miners and incorporation of the transaction into a block.

SUMMARY

In some embodiments, a system comprises a non-transitory machine readable storage medium storing a database identifying a plurality of assets and a state of each respective asset. The storage medium further stories a set of computer program instructions. A processor is coupled to the storage medium, such that when the processor executes the computer program instructions, the processor performs a method comprising: receiving a plurality of updates to a distributed electronic ledger managed by a plurality of peer processors, each of the plurality of updates including an event or change affecting a respective one of the plurality of assets, the peer processors verifying respective portions of the distributed electronic ledger describing each respective event or change, wherein at least one of the plurality of updates has not yet been recorded in the distributed electronic ledger at a time of the receiving; computing a respective state of each asset, based on the plurality of updates; receiving a request for a state of a selected one of the plurality of assets; and responding to the request, the responding reflecting each event and each change affecting the selected asset, the responding being performed by the processor without waiting for the peer processors to verify the at least one of the plurality of updates that has not yet been recorded in the distributed electronic ledger.

In some embodiments, a point of service (POS) terminal comprises: a non-transitory machine readable storage medium storing a set of computer program instructions; and a processor coupled to the storage medium, such that when the processor executes the computer program instructions, the processor performs a method comprising: providing an interface for a user to input a request for authorization for changing a state of a first asset that is included among a plurality of assets tracked in a distributed electronic ledger; transmitting the request to a database management system (DBMS), wherein the database management system computes the respective status of each of the plurality of assets by processing each of a plurality of updates that are used by a peer processor to generate a block of the distributed electronic ledger; receiving the state of the first asset from the DBMS; and authorizing the request in the case where the received state of the first asset satisfies a predetermined condition, wherein at least one of the plurality of updates affecting the first asset has not yet been recorded in the distributed electronic ledger at a time of the authorizing.

In some embodiments, a non-transitory machine readable storage medium stores a database identifying a plurality of assets and a state of each respective asset. The storage medium further stores a set of computer program instructions, such that when a processor executes the computer program instructions, the processor performs a method comprising: receiving a plurality of updates to a distributed electronic ledger managed by a plurality of peer processors, each of the plurality of updates including an event or change affecting a respective one of the plurality of assets, the peer processors verifying respective portions of the distributed electronic ledger describing each respective event or change, wherein at least one of the plurality of updates has not yet been recorded in the distributed electronic ledger at a time of the receiving; computing a respective state of each asset, based on the plurality of updates; receiving a request for a state of a selected one of the plurality of assets; and responding to the request, the responding reflecting each event and each change affecting the selected asset, the responding being performed by the processor without waiting for the peer processors to verify the at least one of the plurality of updates that has not yet been recorded in the distributed electronic ledger.

In some embodiments, a method comprises: receiving, by a database management system, a plurality of updates to a distributed electronic ledger managed by a plurality of peer processors, each of the plurality of updates including an event or change affecting a respective asset, the peer processors verifying respective portions of the distributed electronic ledger describing each respective event or change; computing, by the database management system, a respective state of each asset, based on the plurality of updates; and responding to a request for a state of a selected one of the assets, the responding reflecting each event and each change affecting the selected asset, the responding being performed by the database management system without waiting for the peer processors to verify a recent one of the events or changes affecting the state of the selected asset.

BRIEF DESCRIPTION OF THE DRAWINGS

FIG. 6 is a flow chart showing a query to a companion database for an application server block chain according to some embodiments.

FIG. 11 is a diagram showing an example of an organization of the companion database of FIG. 1.

DETAILED DESCRIPTION

Figure 1:
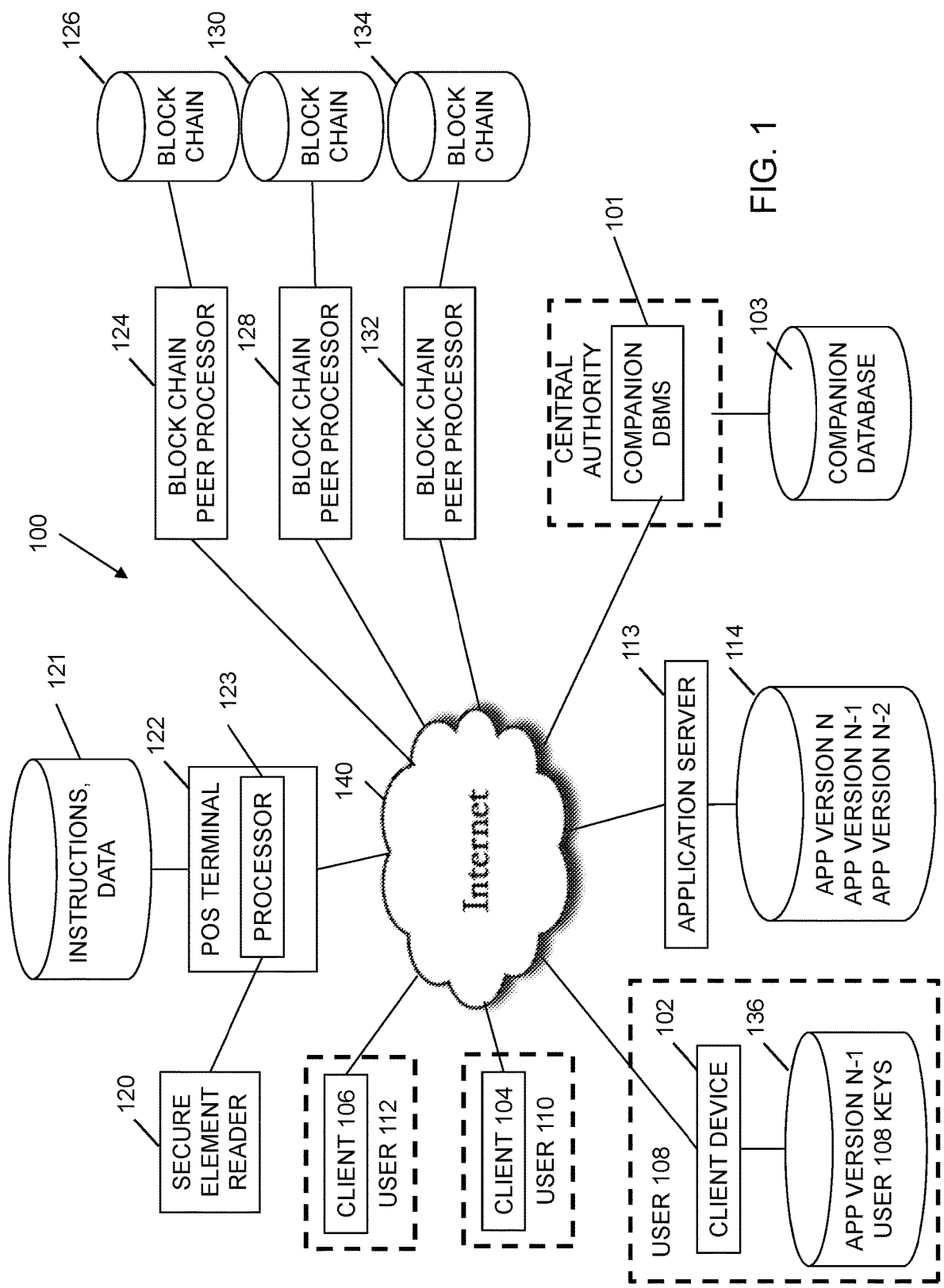
FIG. 1 is a diagram of a system in accordance with some embodiments of the present disclosure.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

One advantage of block chain based ledgers is the public nature of the block chain architecture that allows anyone in the public to review the content of the ledger and verify ownership. The decentralized block chain approach also makes the system fairly robust in comparison to centralized server systems by allowing multiple distributed networks to verify the contents of a single ledger. This allows for redundancy and minimizes risk of falsification of ledgers. The size of the block chain often makes it an onerous task to search and pin point a specific transaction. Searching through a block chain construct is a computationally intense process.

To achieve a desired level of confidence that a party transferring an asset (e.g., a buyer paying for an asset with digital currency) is not double spending, the recipient (e.g., a seller) typically waits until a desired number of block chain peer processors have published a block in the block chain containing the transaction transferring that asset, before the recipient transfers the asset to the buyer. For example, the seller may wait until six blocks are published, which can take more than an hour in some cases, before the seller delivers goods or services to the buyer. This extended delay between payment and delivery is atypical of retail sales in bricks-and-mortar stores, where buyers often expect immediate delivery of goods or services upon tender of payment.

This disclosure provides a system and method for reducing the time till approval of an exchange involving a transfer of a block chain tracked asset. A companion database contains a data structure that can be searched quickly, readily providing data and metadata relevant to a transaction before a new block containing that transaction is added to the block chain.

FIG. 1 is a block diagram of a system 100 in accordance with some embodiments of the present disclosure. System 100 may be a computing environment including one or more block chain peer processing systems 124, 128, 132, client devices 102, 104, and 106, a companion database management system (DBMS) 101, a companion database 103 populated and maintained by the companion DBMS 101, an application server 113 that distributes an application stored in a medium 114, and a communications network 140 (e.g., the Internet) connecting various components of system 100. A point of service (POS) terminal 122 is located in a merchant's facility. The POS terminal 122 can have a secure element reader 120. Although three client block chain peer processors 124, 128, 132 are shown in this example, any number of block chain peer processors may be included. Although three client devices 102, 104, 106 are shown in this example, any number of client devices may be included. Although one application server 113 is shown in this example, any number of application servers may be included.

In some embodiments of this disclosure, the companion database 103 stores the status of each asset in the block chain ledger 126, 130, 134. For example, in the case where the assets are currency accounts, the companion database 103 stores the balance of each account. The companion database 103 can be optimized for rapid searching, so that a seller of an asset (e.g., goods or services) can quickly query the companion database 103 and decide whether to immediately transfer an asset to the buyer (in exchange for the buyer's transfer of a block chain tracked asset to the seller) without waiting for validation of the transaction transferring the asset from the block chain. In some embodiments, the companion database 103 stores metadata associated with the transactions and can use this information for indexing and/or searching the companion database. This disclosure also provides a mechanism to audit the companion database 103, to ensure that it has not been corrupted.

The companion database 103 provides rapid access to data that would otherwise take considerable time to locate and/or compute from information available in the block chain.

Client Devices

Referring back to FIG. 1, each of client devices 102, 104, and 106 may include a computing device, such as a hashing computer, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on a display device. At least one of client devices 102, 104, and 106 may be associated with one or more users, such as users 108, 110, and 112, as shown in FIG. 1. For example, user 110 operates client device 104 and causes it to perform one or more operations in accordance with various embodiments.

Each client device 102, 104, 106 includes one or more tangible, non-transitory memories (e.g., non-transitory machine readable storage medium 136) that store data and/or software instructions, and one or more processors configured to execute software instructions. Client devices 102, 104, and 106 may include one or more display devices that display information to a user and one or more input devices (e.g., keypad, keyboard, touchscreen, voice activated control technologies, or any other type of known input device) to allow the user to input information to the client device.

In some embodiments, each client device 102, 104, and 106 stores in memory one or more software applications that run on the client device and are executed by the one or more processors. In some embodiments, each client device stores software applications that, when executed by one or more processors, perform operations that establish communications with one or more of peer systems 124, 128, 132 (e.g., across network 140) and that obtain, from peer systems 124, 128, 132, a current version of a block-chain ledger 126, 130, 134 generated and maintained in accordance with various embodiments.

Client devices 102, 104, and 106 may provide information associated with one or more actions or transactions involving the tracked assets (e.g., information identifying the actions or transaction, information identifying the assets, a public key, a digital signature, etc.) to peer systems 124, 128, 132.

In some embodiments, the stored application(s) include a wallet application provided by business entity (e.g., a mobile wallet application or an application executable on a desktop computer). The wallet application is capable of initiating transactions denominated in one or more currencies, including digital currencies such as Bitcoin™.

POS Terminal

The system may also include one or more point-of-service (POS) terminals 122. POS terminal 122 can include a cash drawer, computer, display, keyboard, receipt printer, a barcode scanner and a debit/credit card reader, configured for processing retail transactions. A POS terminal 122 may be used by, or on behalf of, a buyer or retail customer to present a means of payment. In various embodiments, the means of payment can be a credit card, debit card, prepaid card, a chip card, or wallet hardware device. In some embodiments, the POS terminal 122 is also equipped with an internal or external secure element reader 120. The secure element reader 120 interacts with a hardware device (e.g., a chip card), which contains a secure element storing the user's private key, and provides the user's signature when the user presents the wallet and inputs a personal identification number (PIN).

The POS terminal 122 can be a dedicated terminal, or a computer configured with a user interface and suitable reader(s) (e.g., debit/credit card reader, and/or secure element reader) permitting the user to input a transaction affecting the state of an asset tracked in the block chain. In some embodiments, the POS terminal 122 provides an interface for a user (e.g., a merchant) to query the companion database 103 for near-real-time status of a tracked asset (such as a balance of a user's account tracked in the block chain ledger). In other embodiments, the merchant has a separate computer with an interface for use by the merchant to query the companion database 103. In some embodiments, the POS terminal 122 is programmed to transmit metadata related to a transaction to the companion DBMS 101 at the time the transaction is transmitted to the block chain peer processors.

In some embodiments, the secure element reader 120 is coupled to provide the processor of the POS terminal 122 a signature of the user's wallet. The POS terminal 122, receiving the signature from the secure element for validating the request. The POS terminal 122 can automatically transmit a query to the companion DBMS, requesting the state of the first asset.

In some embodiments, the POS terminal 122 has a non-transitory machine readable storage medium 121 storing a set of computer program instructions; and a processor 123 coupled to the storage medium 121, such that when the processor 123 executes the computer program instructions, the processor 123 provides an interface for a user to input a request for authorization for changing a state of a first asset that is included among a plurality of assets tracked in a block chain ledger. The processor 123 transmits the request to the companion DBMS 101. The DBMS 101 computes the respective status of each of the plurality of assets by processing each of a plurality of updates that are used by a peer processor to generate a block of the block chain ledger. The POS terminal 122 receives the state of the first asset from the companion DBMS 101. The POS terminal 122 authorizes the request in the case where the received state of the first asset satisfies a predetermined condition, wherein at least one of the plurality of updates affecting the first asset has not yet been recorded in the block chain ledger at a time of the authorizing.

For example, in some embodiments, the POS terminal 122 issues a transaction to the block chain to transfer an amount from the digital currency account to an address corresponding to the merchant. The POS terminal 122 also requests a balance from a recipient account that corresponds to the transaction, at a time when that transaction has not yet been recorded in the block chain ledger.

Exemplary Computer Systems

System 101 can be a computing system configured to execute software instructions to perform one or more operations in accordance with various embodiments. In some embodiments, companion DBMS server 101 is a computing device that executes DBMS software instructions to perform operations that provide information to at least one other component of computing environment 100. Examples of suitable hosting platforms include but are not limited to use the following, NoSQL (e.g., column, document, key-value, graph, or multi-model types), SSA, Red Brick Warehouse (by IBM Corp. of Armonk, N.Y., Database by Teradata of Dayton Ohio, or Greenplum by Pivotal Corporation, Vancouver, CA. In some embodiments, companion DBMS 101 provides advance validation or invalidation messages in response to queries from business entities (e.g., merchants). For instance, companion DBMS 101 may be configured to provide information associated with a request to validate/invalidate a digital currency transaction over communications network 120 to a merchant having a point-of-service (POS) terminal 122 at a bricks-and-mortar store.

In some embodiments, companion DBMS 101 is associated with a central authority (e.g., a financial institution or regulatory or enforcement authority). The companion database 103 can be a privately controlled database. In some embodiments, a central authority operates and limits access to the database (e.g., limited to merchants and/or miners). In other embodiments, the central authority performs all queries to the database, in response to requests sent from merchants and/or miners to the central authority. In some embodiments, system 101 is a distributed system that includes computing components distributed across one or more networks, e.g., network 140. The companion DBMS 101 is protected by security software, including a firewall, but the companion DBMS is not a block chain ledger.

In some embodiments, companion DBMS 101 includes computing components configured to store, maintain, and generate data and software instructions. For example, companion DBMS 101 may include one or more servers (e.g., companion DBMS 101) and tangible, non-transitory memory devices (e.g., companion database 103). Companion DBMS 101 may include one or more computing devices configured to execute software instructions to perform one or more processes in accordance with various embodiments.

In some embodiments, the companion DBMS 101 is a hierarchical database management system. In other embodiments, the companion database 103 is a relational database having a plurality of tables arranged using an adjacency list model to organize the data hierarchically.

In one embodiment, an application server 113 includes a computer (e.g., a personal computer, network computer, or mainframe computer) having one or more processors that are selectively activated or reconfigured by a computer program. In one embodiment, server 113 (or other computing components of system 113) may be configured to provide one or more websites, digital portals, etc., that provide services consistent with hosting business entities and/or individuals.

In other embodiments, application server 113 (or other computing components) may be configured to provide software and/or information to one or more application programs executed by client device 102, e.g., through a corresponding application programming interface (API). For example, client device 102 may execute an application program associated with and provided by business entity, such a mobile banking application and/or a mobile wallet application, to provide services in accordance with various embodiments. In some instances, application server 113 provides software updates and information to client devices 102, 104, and/or 106 (e.g., through the API associated with the executed application program), and client devices 102, 104, and/or 106 present portions of the information to corresponding users through a corresponding graphical user interface (GUI).

Server 113 (or other computing components of system 113) may be configured to provide to client devices 102, 104, and/or 106 (and/or receive from any of the client devices) information associated with services provided by a business entity. For example, client device 102 may receive the transmitted information, and store portions of the information in locally accessible storage device and/or network-accessible storage devices and data repositories (e.g., cloud-based storage). In one instance, client device 102 executes stored instructions (e.g., an application program, a web browser, a mobile banking application, and/or a mobile wallet application) to process portions of the stored data and render portions of the stored data for presentation to user 110. Additionally, application server 113 may be incorporated as a corresponding node in a distributed network or as a corresponding networked server in a cloud-computing environment. Furthermore, application server 113 may communicate via network 140 with one or more additional servers (not shown), which may facilitate the distribution of processes for parallel execution by the additional servers.

In other embodiments, application server 113 controls distribution and support of one or more software applications to network-connected client devices, which can include clients 102, 104, 106 and/or other network connected devices (such as computers, network connected printers, scanners, facsimile machines, multi-function printers, mobile phones, tablets or the like).

Exemplary Data Repositories and Stored Data

Data repository 114 may include one or more memories that are configured to store and provide access to data and/or software instructions. Such memories may include tangible non-transitory computer-readable media that store software instructions that, when executed by one or more processors, perform one or more operations in accordance with various embodiments. Data repository 114 may also be configured to store information relating to a business entity, e.g., a financial institution.

In some embodiments, the data repository 114 of application server 113 contains a plurality of versions of each supported application program (app). One or more of the versions may have a prerequisite version to permit an upgrade to a later version.

For example, in an embodiment the application server 113 can implement a rule requiring a client 102 to be running version N−1 of an app before upgrading to version N. In the case where the client 102 is currently running version N−2 of the app, the client 102 must upgrade to version N−1 before the client can download version N. In some embodiments, each download of any version of the app is recorded in the block chain ledger 126, 130, 134, and the respective version number of the program currently running in each respective client 102, 104, 106 is tracked in the companion database 103.

Similarly, one or more other data repositories can be included, corresponding to other types of assets (e.g., smart contracts) tracked in a block chain database.

Exemplary Communications Networks

Communications network 140 may include one or more communication networks or media of digital data communication. Examples of communication network 140 include a local area network ("LAN"), a wireless LAN, a RF network, a Near Field Communication (NFC) network, (e.g., a "WiFi" network), a wireless Metropolitan Area Network (MAN) connecting multiple wireless LANs, NFC communication link(s), and a wide area network ("WAN"), e.g., the Internet. In accordance with various embodiments of the present disclosure, communications network 140 may include the Internet and any publicly accessible network or networks interconnected via one or more communication protocols, including, but not limited to, hypertext transfer protocol (HTTP) and transmission control protocol/internet protocol (TCP/IP). Communications protocols in accordance with various embodiments also include protocols facilitating data transfer using radio frequency identification (RFID) communications and/or NFC. Moreover, communications network 120 may also include one or more mobile device networks, such as a GSM network or a PCS network, allowing client device 104 to send and receive data via applicable communications protocols, including those described herein.

Exemplary Peer Systems

Referring back to FIG. 1, peer systems 124, 128, 132 may include one or more special purpose hardware and/or computing systems configured to execute software instructions to perform one or more operations in accordance with various embodiments. In some embodiments, peer systems 124, 128, 132 may include computing components configured to store, maintain, and generate data and software instructions. For example, each of peer systems 124, 128, 132 may include one or more computing devices (e.g., a server, network computer, or mainframe computer) having one or more processors that may be selectively activated or reconfigured by executable instructions (e.g., computer programs) stored in one or more tangible, non-transitory computer-readable storage devices.

In some embodiments, one or more of peer systems 124, 128, 132 are configured to receive, from client device 102 across network 140, information associated with a distribution of, transaction involving, or other action associated with one or more assets tracked within block-chain ledgers 126, 130, 134 in accordance with various embodiments.

In some embodiments, one or more of peer systems 124, 128, 132 are configured (e.g., by the executed software programs) to validate the received information and to generate a new block of the block-chain ledger 126, 130, 134. The new block includes the received information, either alone (e.g., using a "one transaction, one block" paradigm) or in combination with information identifying additional distributions, transactions, or other actions associated with one or more tracked assets (e.g., as a multiple-transaction block). In some embodiments, the one or more peer systems 124, 128, 132 may maintain the updated versions of the public ledger (i.e., the latest, longest public ledger), and may provide the updated version of the ledger to client devices 102, 104, and/or 106 (or other client devices associated with other users) upon receipt of a request across network 120 and/or at regular or predetermined intervals.

In certain instances, and in addition to a connection with network 120, peer systems 124, 128, 132 may be interconnected across a peer-to-peer network (not depicted in FIG. 1) using any of the wired or wireless communications protocols outlined above. Further, in some instances, one or more of peer systems 124, 128, 132 may function as a "miner," where any miner may be compensated in units of a virtual currency (e.g., Bitcoin™) for validating the received data and for generating updated versions of the block-chain ledger.

Asset Tracking Using Block-Chain Ledgers

Figure 2:
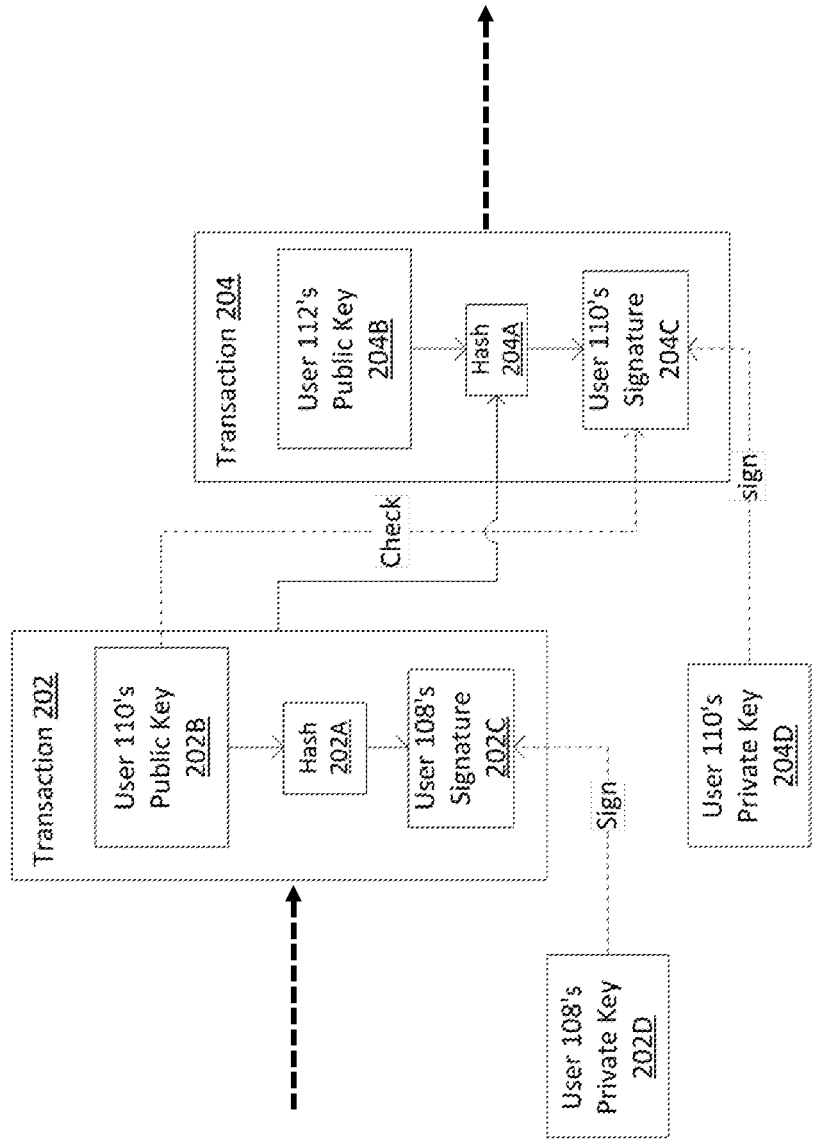
FIG. 2 is a diagram of a block-chain ledger architecture.

FIG. 2 is a diagram of a structure 200 of a block-chain ledger, which may be generated through the interaction of components of computing environment 100. In the example of FIG. 2, user 110 is associated with client device 104, which executes a stored software application (e.g., a wallet application) capable of obtaining a current version of a conventional block-chain ledger from one or more networked computer systems (e.g., one of peer systems 124, 128, 132 configured to "mine" broadcasted transaction data and update ledgers 126, 130, 134). The current version of a block-chain ledger may represent a "longest" block-chain ledger than includes a maximum number of discrete "blocks." The blocks identify respective transactions that transfer and/or distribute portions of tracked assets among various owners, including user 110.

FIG. 2 shows blocks corresponding to two transactions 202 and 204, with arrows to the left and right of these transactions indicating that these are merely two transactions in a potentially longer series of chained blocks (hence the term "block-chain ledger"). In the first transaction (transaction 202) depicted in FIG. 2, user 108 transfers ownership of a portion of tracked assets (e.g., of some amount of a virtual currency or digital currency) to user 110. In the second transaction (transaction 204), user 110 transfers ownership to user 112. In general, any number of transactions may be supported.

Client device 104 obtains the current block-chain ledger and processes the block-chain ledger to determine that a prior owner (user 108 in this example) transferred ownership of a portion of the tracked assets to user 110 in transaction 202. One or more peer systems 124, 128, 132 previously verified, processed, and packed data associated with transaction 202 into a corresponding block of the conventional block-chain.

Transaction 202 includes a cryptographic hash (e.g., hash 202A) of one or more prior transactions, and a public key of the recipient (e.g., public key 202B of user 110). The transaction data may also include a digital signature 202C of user 108 (the prior owner), which is applied to hash 202A and public key 202B using a private key 202D of user 108 through any of a number of techniques apparent to one of skill in the art. The presence of user 108's public key within transaction data included within the conventional block-chain ledger facilitates verification of user 108's digital signature 202C by client device 104 and/or peer systems 124, 128, 132.

In the second transaction (transaction 204), user 110 transfers the tracked asset portion to user 112. For example, client device 104 may execute one or more software applications (e.g., wallet applications) that generate data specifying a transaction (e.g., transaction 204) transferring ownership of the tracked asset portion from user 110 to user 112, and further. The software application(s) transmit the generated data to one or more of peer systems 124, 128, 132 for verification, processing (e.g., additional cryptographic hashing) and inclusion into a new block of the block-chain ledger.

For example, data specifying transaction 204 may include a cryptographic hash 204A of prior transaction 202, a quantity or number of units of the tracked asset portion that are subject to transfer in transaction 204, and a public key of the recipient (e.g., public key 204B of user 112). Further, in some embodiments, the data specifying transaction 204 may include a digital signature 204C of the user 110, which may be applied to hash 204A and public key 204B using a private key 204D of user 110. Further, and by way of example, the presence of user 110's public key 202B within transaction data included within the block-chain ledger may enable various devices and systems (e.g., client devices 106, 106, and/or 108, peer systems 124, 128, 132, etc.) to verify user 110's digital signature 204C, as applied to data specifying transaction 204.

One or more of peer systems 124, 128, 132 may receive the data specifying transaction 204 from client device 104. In certain instances, peer systems 124, 128, 132 may act as "miners" for the block-chain ledger 126, 130, 134, and may competitively process the received transaction data (either alone or in conjunction with other data) to generate additional blocks of the ledger, which may be appended to the block-chain ledger and distributed across peer systems 124, 128, 132 (e.g., through a peer-to-peer network) and to other connected devices of environment 100.

Update Processing

Figure 3:
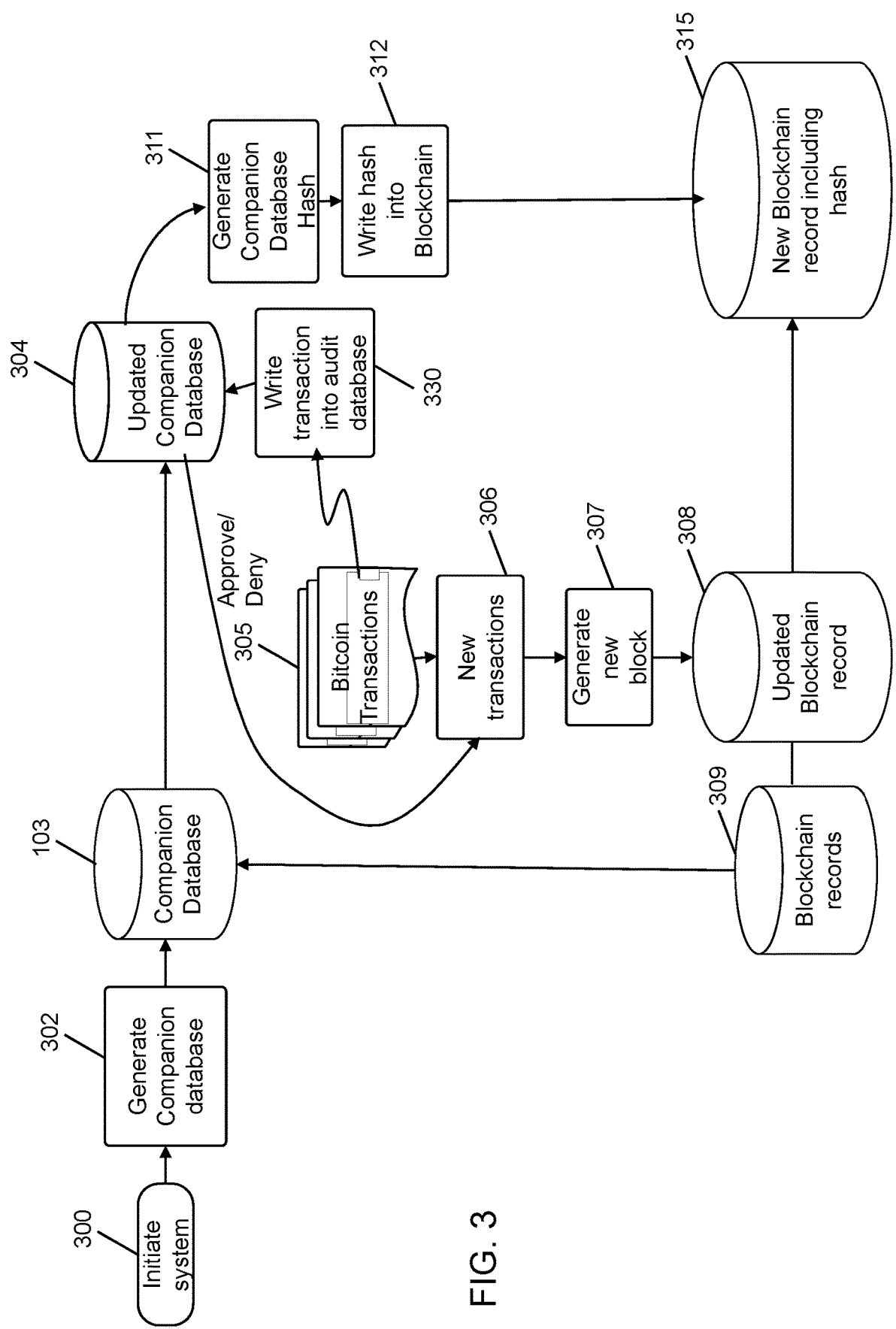
FIG. 3 is a schematic diagram showing a method of processing transactions to update the block chain ledger and the companion database of FIG. 1.

FIG. 3 is a schematic diagram showing a method of processing transactions to update both the block chain ledger 309 and the companion database 103.

At step 300, the system is initiated.

At step 302, the processor of the central authority 101 generates companion database 103. The companion DBMS processor 101 obtains a complete copy of the block chain ledger 309. Processor 101 traverses each record (e.g., transaction records) in the block chain 309 chronologically, beginning with the genesis block. Processor 101 creates a respective shadow account in the companion database 103 for each respective address referenced in a respective transaction in the block chain. Each shadow account includes a current state (e.g., asset value) of the respective asset corresponding to that address and a respective record for each transaction affecting that account, including the transaction number, state change (e.g., amount of reduction or increase), source address and destination address.

In some embodiments, the database 103 is a hierarchical database, arranged as a tree structure, with each shadow account in a respective leaf of the tree structure, as discussed below with respect to FIGS. 9-11. When the companion DBMS processor 101 has traversed each transaction record in the copy of the block chain ledger, the initial companion database 103 is populated. After the initial population of the companion database 103 is completed, each successive block chain transaction is received by both the block chain peer processors 124, 128, 132 and the central authority DBMS 101, which perform their respective processing asynchronously, in parallel to each other.

In general, the companion DBMS 101 processes each transaction in real time or near real time, in First-in, First-Out (FIFO) order, immediately after receipt. The block chain peer processors can delay processing of one or more transactions, and can process the transactions in a FIFO order or in a different order that is expected to improve profits from transaction processing.

At block 305, a plurality of updates (e.g., records of changes or events) affecting the state of the tracked assets are received by the companion DBMS 101 in parallel with the receipt by the block chain peer processors 124, 128, 132. Each of the plurality of updates includes an event or change affecting a respective asset. For example, in some embodiments, the tracked assets are digital currency accounts, and the updates are transactions transferring units of a digital currency from a source address to a destination address. In other embodiments, the tracked assets are network connected devices (e.g., printers or computing devices), and the updates are records of new software version downloads.

At block 330, the new updates (e.g., transactions) received by the companion database are written to the companion database.

For example, in the case where the updates are transactions transferring an amount of digital currency (e.g., Bitcoin™) from a sender to a recipient, then at block 304, the companion DBMS 101 updates the accounts in the leaf nodes of the companion database 103 corresponding to the sender address and recipient address. The updates to the sender account and recipient account includes addition of a record of the transaction, and a change to the account balance. The resulting updated account records are stored in an "updated companion database" 304. The companion DBMS 101 compares the amount to be transferred with the balance of the sender's account immediately prior to processing this transaction. In the case where the account balance (before this transaction) is at least large enough to cover the amount of the transfer, then the companion DBMS 101 pre-approves the transaction, and includes a metadata field (FIG. 11) for this record indicating that the transaction is valid.

In the case where the account balance (before this transaction) is smaller than the amount of the transfer specified, then the companion DBMS 101 invalidates the transaction and includes a metadata field for this record in the updated companion database 103, indicating that the transaction was invalid.

In some embodiments, the companion DBMS 101 receives and stores additional metadata (FIG. 11) pertinent to one or more of the updates. For example, in the case where an update is an asset transfer transaction initiated at a POS terminal 122, the POS terminal 122 may provide additional information relevant to the transactions. For example, a POS terminal 122 may provide a merchant identification identifying a retail store at which the transaction occurred and/or a geographic area (e.g., city, state, or multi-state region) in which the transaction occurred. In some embodiments, the metadata include one or more of product stock keeping unit (SKU), merchant standard industrial classification (SIC) class, or the like.

At block 306, the companion DBMS 101 notifies the POS terminal 122 of the valid/invalid state of any new transaction 305. In the case where a transaction is invalid (e.g., because an account has an insufficient balance to transfer the required amount), the merchant can deny the transaction in near-real time.

At block 311, the companion DBMS 101 generates a hash of the entire companion database 103. The companion DBMS provides a time stamped hash value to each of the block chain peer processors 126, 130, 134.

At block 312, the block chain peer processors 126, 130, 134 can include the hash value of the companion database 103 in the next new block added to the block chain ledger.

Block 315 shows a copy of the block chain to which the additional block has been added, including a hash of the companion database 103 appended at the end.

The companion DBMS 101 calculates the updated balance of the account on a transaction-by-transaction basis, and stores the balance in the companion database 103. The companion DBMS 101 is not required to perform proof-of-work calculations that are performed by block chain peer processors 124, 126, 128 (such as digital currency miners) for each block of transactions. Thus, the companion DBMS 101 can generally update the companion database 103 and pre-confirm a transaction (by calculating the updated state of the asset) before the block chain peer processors complete the proof-of-work computations necessary to generate a new block in the block chain. This capability can make pre-confirmation by the companion database 103 a practical alternative to waiting for confirmation by the block chain for certain transactions involving real-time and near-real time exchange of assets (such as in a bricks-and-mortar retail environment). For example, a merchant can choose to accept pre-confirmation by the companion database 103 as a basis for approving a purchase using a block chain tracked asset, and deliver the purchased goods immediately upon receipt of the pre-confirmation.

In one non-limiting example, an average amount of time for miners to generate a new block of the block chain for a particular digital currency is 10 minutes. Meanwhile, the companion DBMS 101 can calculate the updated balance of the buyer's digital currency account (taking into account transactions that have not yet been confirmed in a block) in less than one second. Assume a merchant chooses to wait until a transaction is confirmed in six blocks of the block chain before the merchant will accept the transaction as a valid payment and tender any goods or services to a buyer. Then the merchant can expect to wait at least an hour for confirmation (and possibly longer). Because of this delay, the seller may choose to not accept that particular digital currency for any sales requiring immediate tender of goods. The seller may require the buyer who pays with that digital currency to wait until confirmation before the seller will tender any goods.

With the addition of the companion database 103, the merchant can obtain a pre-confirmation of the balance from the companion DBMS 101 in near-real time. In some embodiments, the merchant's POS terminal 122 can be programmed to use a rules-based system to automatically approve purchases that satisfy certain criteria based on the pre-confirmation from the companion database. For example, the POS terminal 122 can approve purchases below a first threshold amount (e.g., $100, $200, or the like) based on pre-confirmation from the companion database. In some embodiments, the POS terminal 122 is programmed to authorize a purchase in the case where the balance is greater than or equal to a price of the purchase, and refuse to accept payment from the digital currency account in the case where the balance is less than the price of the purchase. In other embodiments, the merchant can approve purchases between the first threshold amount and a higher second threshold amount based on pre-confirmation from the companion database, in the case where the sale conveys a product (e.g., an automobile) that can be repossessed.

Thus, the addition of the companion database allows users to establish criteria and automated computer implemented rules for accepting block chain tracked assets as a medium of payment in transactions requiring real-time or near real-time delivery of goods or services upon tender of payment. This capability makes use of block chain tracked digital currency practical as a medium of exchange for bricks-and-mortar retail stores, where goods are delivered immediately upon tender of a payment instrument.

The block chain methodology provides reliability through redundant processing, and provides resistance to tampering by virtue of the proof-of-work and repeated confirmation processing. The companion DBMS 101 takes advantage of the block chain reliability by appending a hash of the companion database 103 to the block chain. The companion DBMS 101 can periodically compute a hash of the companion database 103 locally. In the event of any corruption in the companion database 103, the companion DBMS 101 can compare the locally stored hash with the hash stored in the block chain at a plurality of points in time, and roll back the companion database 103 to a point in time before the corruption occurred (i.e., when the local hash matched the hash stored in the block chain). The companion DBMS can then re-process any transactions that occurred after the roll back time to regenerate the companion database 103.

Figure 4:
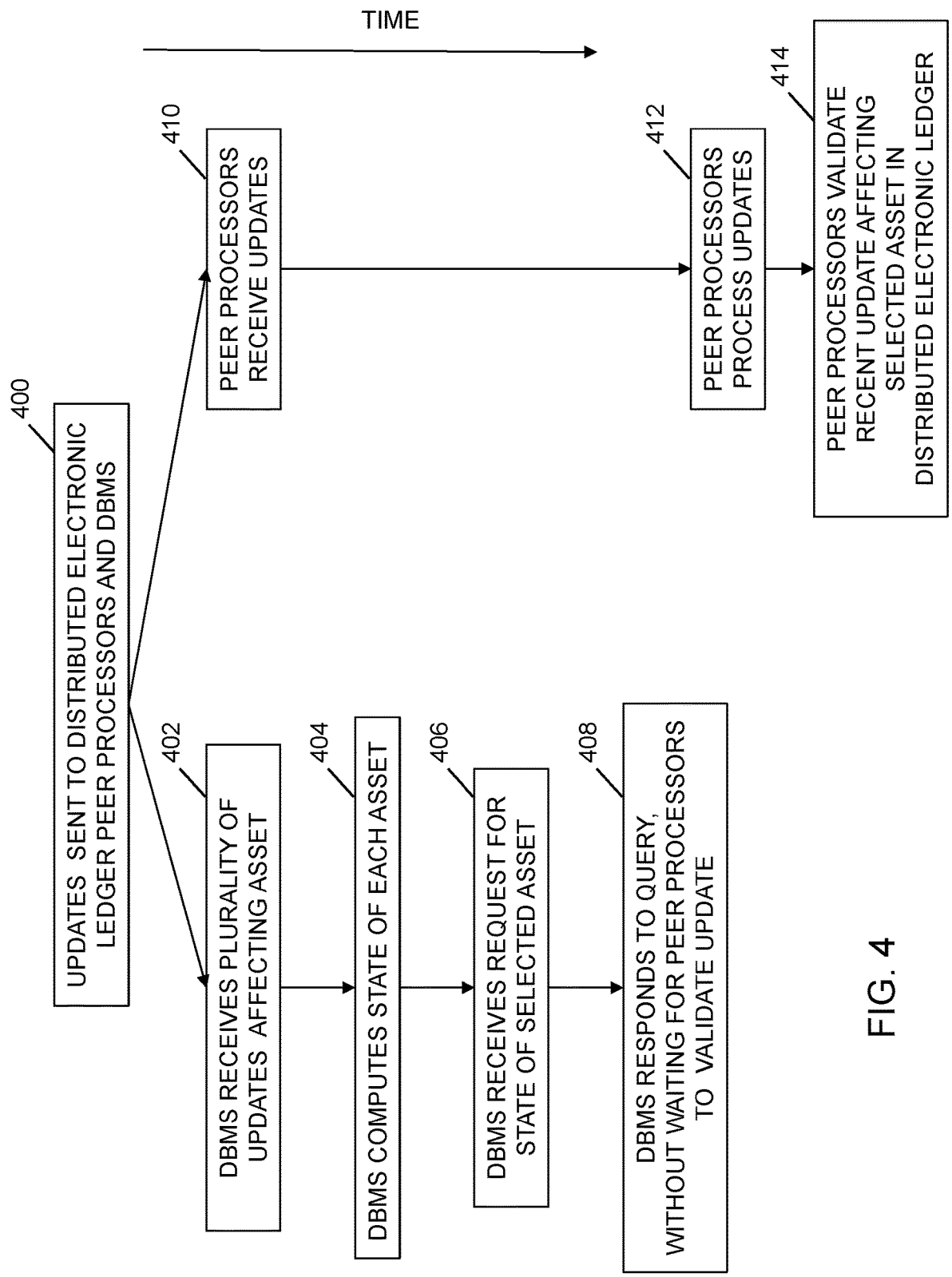
FIG. 4 is a flow chart showing a query to a companion database according to some embodiments.

FIG. 4 is a flow chart of a method of use of the companion database.

At step 400, a plurality of updates is sent to the distributed electronic ledger peer processors 124, 128, 132 and to the companion DBMS 101.

At step 402, the companion DBMS 101 computes the state of each asset affected by the updates. The DBMS 101 stores the updated state of each affected asset in the record corresponding to that asset.

At step 406, the companion DBMS receives a request (e.g., from a merchant) for the state of a selected asset.

At step 408, the companion DBMS 101 responds to the request for the state of the selected one of the assets. The response reflects each event and each change affecting the selected asset. The responding is performed by the DBMS without waiting for the peer processors 124, 128, 132 to verify a recent one of the events or changes affecting the state of the selected asset.

At step 410, the distributed electronic ledger peer processors 124, 128, 132 receive the plurality of updates at about the same time the companion database 101 receives them. In some configurations, one or more of the peer processors 124, 128, 132 may receive some update later than the remaining peer processors 124, 128, 132.

At step 412, the peer processors process the updates and perform proof-of-work computations before transmitting a block of updates to the distributed electronic ledger. Step 412 can continue beyond the time of step 408, in which the DBMS responds to the query. The peer processors verify respective portions of the distributed electronic ledger describing each respective event or change.

At step 414, the peer processors validate a recent update affecting the selected asset in a new block of the distributed electronic ledger. Step 414 is expected to be performed after the companion DBMS performs step 408.

Figure 5:
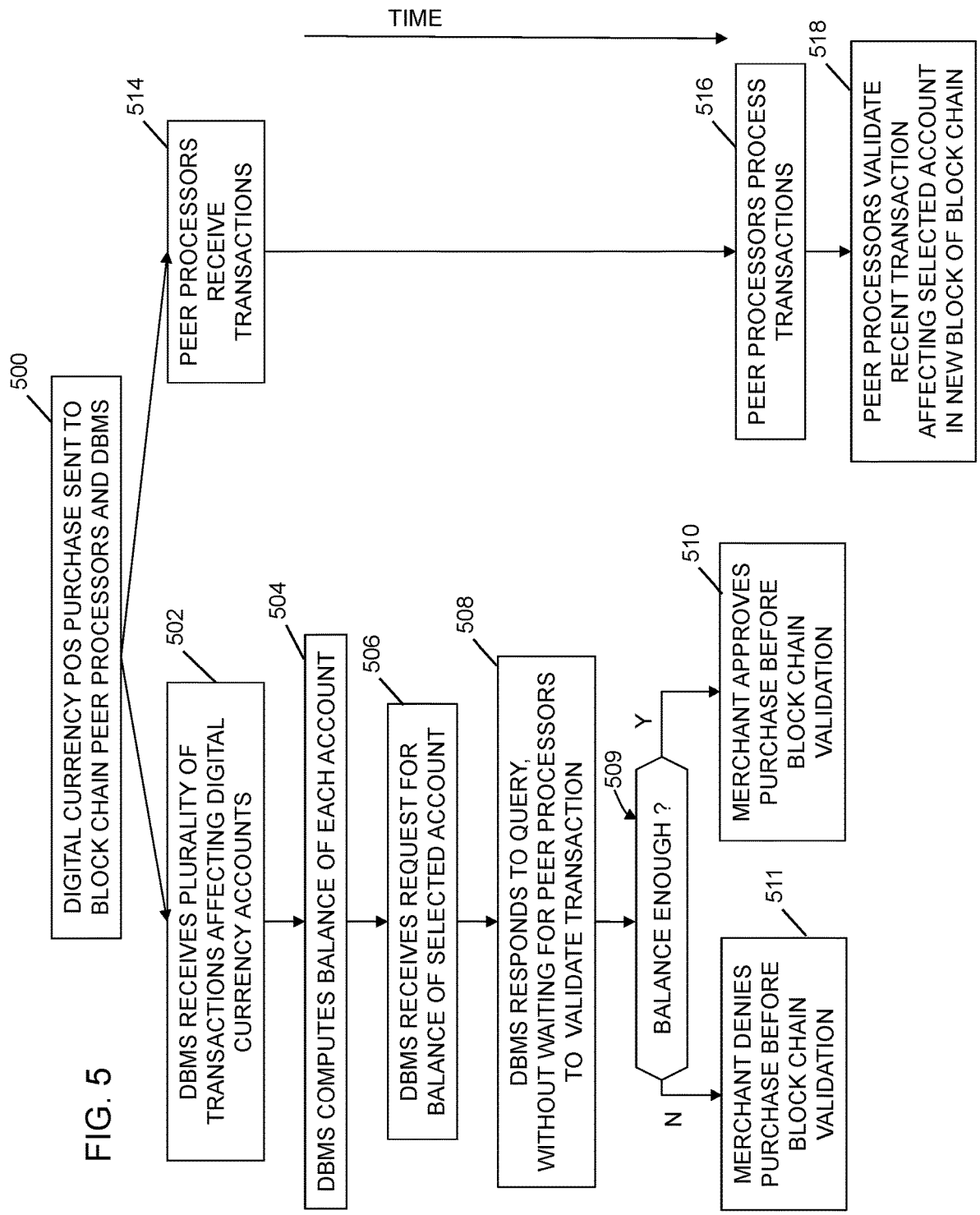
FIG. 5 is a flow chart showing a query to a companion database for a digital currency block chain according to some embodiments.

FIG. 5 is a flow chart of a method in which the distributed electronic ledger is a block chain ledger. The block chain ledger tracks a plurality of digital currency accounts. Each asset is a digital currency account, and the state of each asset is a balance of the respective digital currency account. The events or changes include creation of an amount of digital currency or transfer of digital currency from an account associated with a first address to an account associated with a second address. The responding can include retrieving a balance of the digital currency account by the database management system, before any of the block chain peer processors verifies a recent event or change affecting the balance of the digital currency account. For example, in some embodiments, the request can be made by the central authority on behalf of a seller, to verify that a balance of the digital currency account is sufficient to cover a purchase, before any of the peer processors issue a block containing a recent transaction affecting the digital currency account.

At step 500, a plurality of transactions include a transaction specifying a POS purchase made using digital currency is sent to the block chain peer processors 124, 128, 132 and to the companion DBMS 101.

At step 502, the companion DBMS 101 receives data and metadata for the plurality of transactions affecting digital currency accounts.

At step 504, the companion DBMS 101 computes the state of each asset affected by the updates. The DBMS 101 stores the updated balance of the selected asset in the record corresponding to that asset.

At step 506, the companion DBMS receives a request from a merchant for the balance of a selected account. The request is for the purpose of validation of a purchase transaction in which a buyer proffers payment from a digital currency account.

At step 508, the companion DBMS 101 responds to the request for the balance of the selected account. The response reflects each event and each change affecting the selected account. The responding is performed by the DBMS 101 without waiting for the peer processors 124, 128, 132 to verify a recent one of the transactions affecting the balance of the selected account. In some cases, the responding can identify a potential double-spend condition of the digital currency account before any of the block chain peer processors 124, 128, 132 have processed a recent transaction affecting the selected account, allowing the merchant to deny the transaction in real-time or near-real-time.

At step 509, in the case where the balance of the asset account is enough to cover the purchase, step 510 is performed. In the case where the balance of the asset account is not enough to cover the purchase, step 511 is performed.

At step 510, the merchant approves the tendered payment from the digital currency account before block chain validation. The buyer can receive the goods immediately thereafter.

At step 511, the merchant denies the tendered payment from the digital currency account before block chain validation. The buyer can tender another means of payment and receive the goods immediately thereafter.

At step 514, the block chain ledger peer processors 124, 128, 132 receive the plurality of transactions at about the same time the companion database 101 receives them. In some configurations, one or more of the peer processors 124, 128, 132 may receive some transactions later than the remaining peer processors 124, 128, 132.

At step 516, the peer processors process the transactions and perform proof-of-work computations before transmitting a block of updates to the block chain. Step 514 can continue beyond the time of step 508, in which the companion DBMS 101 responds to the query. The peer processors 124, 128, 132 verify respective portions of the block chain ledger describing each respective transaction.

At step 518, the peer processors validate a recent update affecting the selected asset in a new block of the distributed electronic ledger. Step 518 is expected to be performed after the companion DBMS 101 performs step 508.

FIG. 6 is a flow chart of another example in which the companion database provides real-time status information regarding an asset. In this example, each asset is a network connected device which stores and executes a program having a program version. The block chain stores a respective identifier of the version of the program stored in each network connected device. The request is a query from an application server 113, received by the companion DBMS 101 for identification of the version of the program installed in the network connected device 102. The application server 113 issues the query in response to a request from the device 102 to download a new version of the program to the device 102, The devices 102, 104, 106 can include computing devices (computer, smart phone, tablet, or the like) or other internet of things (IoT) device with embedded processing and communications hardware and software, such as, but not limited to, heart monitoring implants, biochip transponders, smart thermostat systems, washer/dryers and the like. In the case where the program is a cross-platform program, multiple types of devices can have versions of the program.

At step 600, a plurality of software version update notices are sent by the application server 113 to the block chain peer processors 124, 128, 132 and to the companion DBMS 101. Each software version update notice indicates which version of a software program has been downloaded to a respective one of the connected devices.

At step 602, the companion DBMS 101 receives a plurality of software version update notices indicating the respective version of a software program that has been downloaded to one of the connected devices.

At step 604, the companion DBMS 101 determines which version of the program is installed in each asset affected by the updates. The DBMS 101 stores the updated state of each affected asset in the record within the companion database 103 corresponding to that device.

At step 606, the companion DBMS 101 receives a request from the application server 113 for the version of the program installed in a selected one of the devices 102. For example, a device 102 can request the current version of a program from application server 113, which can be a support site for distributing the software program. Application server 113 can request the version identification to determine whether the device 102 is eligible to receive the current version, based on technical and/or licensing reasons. In the case where the support site (application server 113) is currently distributing version N of a program, the current version N may be available for download by devices currently running version N−1 of the program, but unavailable for download by devices currently running version N−2 of the program.

At step 608, the companion DBMS 101 responds to the request for the version of the software currently installed in the selected device. The responding is performed by the DBMS 101 without waiting for the peer processors 124, 128, 132 to verify a recent one of the software version update notices affecting the selected device.

At step 609, in the case where the device has the prerequisite version of the program installed, step 610 is executed. In the case where the device does not have the prerequisite version of the program installed, step 611 is executed.

At step 610, the application server 113 can immediately download the new version N of the program to the device 102 in the case where the current version N−1 in device 102 is a prerequisite version.

At step 611, the application server 113 will not immediately download the new version N of the program to the device 102 in the case where the current version N−2 in device 102 is not the prerequisite version. In some embodiments, the application server 113 does not download any version upgrade. In other embodiments, the application server 113 is programmed to download the prerequisite version N−1 of the program to the device 102 first in the case where the current version in device 102 is not the prerequisite version (e.g., version N−2 of the program is currently installed in device 102). In some embodiments, the application server 113 is programmed to automatically download the new version N of the program to the device 102 after downloading the prerequisite version N−1 to the device 102 (without waiting for an additional attempt by the user 108 of device 102 to download the new version N).

At step 612, the peer processors process the software version update notices and perform proof-of-work computations before transmitting a block of program version updates to the block chain.

At step 612, the block chain peer processors 124, 128, 132 receive the plurality of software version update notices at about the same time the companion database 101 receives them. In some configurations, one or more of the peer processors 124, 128, 132 may receive some of the software version update notices later than the remaining peer processors 124, 128, 132.

Step 613 can continue beyond the time of step 608, in which the DBMS responds to the query. The peer processors verify respective portions of the block chain describing each respective version downloaded.

At step 614, the peer processors validate a recent software version update notice affecting the selected device in a new block of the block chain. Step 614 is expected to be performed after the companion DBMS 101 performs step 608.

Figures 7A, 7B:
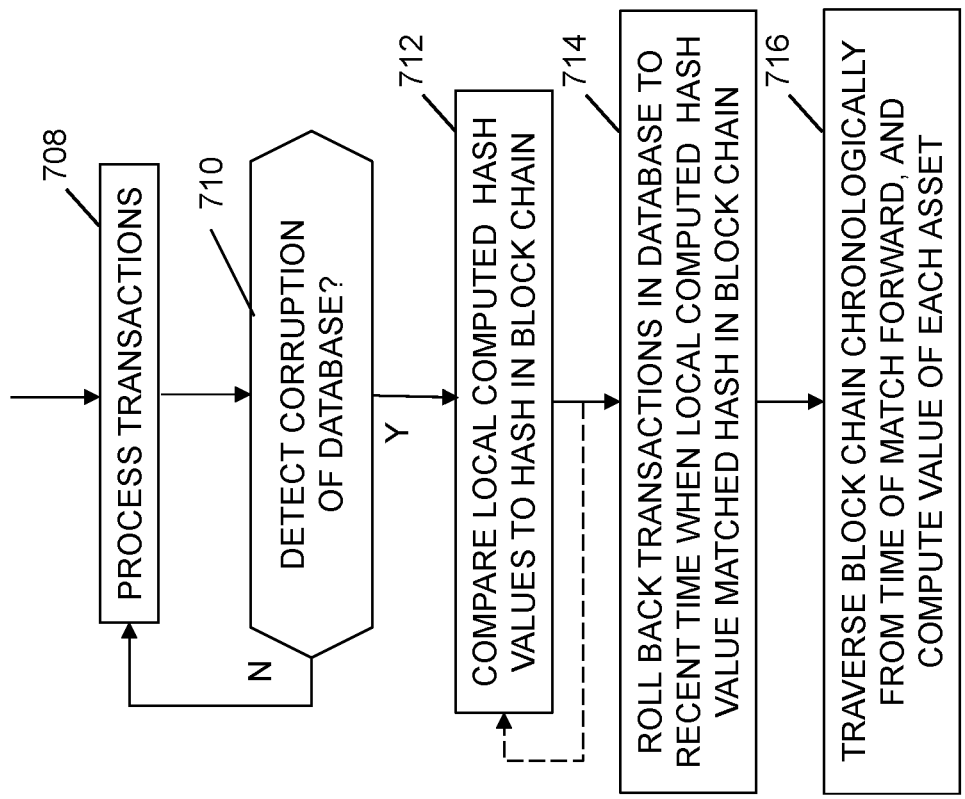
FIG. 7A is a flow chart of a method for generating the companion database of FIG. 1.
FIG. 7B is a flow chart of a method for auditing and correcting the companion database of FIG. 1.

FIG. 7A is a flow chart showing a method for populating the companion database 103.

At step 700, the companion DBMS 101 generates the database by traversing a copy of the block chain ledger chronologically from the genesis block forward, and computing a value of each asset that is sent or received in each transaction traversed.

At step 702, the companion DBMS creates a respective database record for each respective one of the plurality of assets. In some embodiments, each record includes: an address of a recipient of at least a portion of the respective asset, an update identifier of the recent one of the plurality of updates affecting the respective asset is recorded, a status of the respective asset after the recent one of the plurality of updates affecting the respective asset has been applied, and a date stamp of a recent one of the plurality of updates affecting the respective asset, and a block number of a block in the block chain ledger in which the recent one of the plurality of updates affecting the respective asset is recorded. In some embodiments, the assets are accounts, and the state of each asset is a respective current value of each respective account. In other embodiments, the assets are IoT connected devices, and the state is a software version of a program installed in each of the devices.

At step 704, the companion DBMS 103 computes a hash value from the companion database. A suitable hash algorithm may be SHA 256 which is also used to hash blocks within the bitcoin blockchain. The hash of the companion database 103 can be performed by a background process at predetermined intervals.

At step 706, the companion DBMS 101 appends the hash value to the block chain ledger with a time stamp. This hash value of the companion database is appended fully into a block by generating a system level transaction.

FIG. 7B is a flow chart showing a method for auditing and correcting the companion database 103, in the case where the companion database becomes corrupted for any reason.

At step 708, the companion DBMS 101 processes transactions and updates the state of each asset affected by the respective transactions.

At step 710, possible corruption of the companion database is detected in the case where the companion DBMS validates a transaction that is found to be invalid by the block chain (or invalidates a transaction that is found to be valid in the block chain). The possibility of corruption may also be detected in the case where the companion DBMS 101 experiences a hardware or power failure, or data security breach. In the case where no corruption is detected, companion DBMS 101 continues to process transactions at step 708.

At step 712, in the case where corruption is suspected, the companion DBMS 101 compares a local hash value in the companion database to the hash value recorded in the block chain. To make the comparison, the companion DBMS 101 obtains the hash value from the block chain ledger, computes a local hash value of the local copy of the database and verifies the local copy of the database by determining whether the local hash value matches the hash value obtained from the block chain ledger. This comparison can be performed using the companion database hash value stored in a number of blocks in the block chain, until at least one match is found indicating that the corruption had not yet occurred at a previous point in time when the matching block was generated, and at least one mismatch is found indicating that the corruption had already occurred at the point in time when the mismatching block was generated.

At step 714, upon determining that the local hash value does not match the hash value obtained from the block chain ledger, the companion DBMS rolls back the companion database 103 to the previous point in time (found in step 712), when the computed local hash value matched the hash value obtained from the block chain ledger.

At step 716, the companion DBMS 101 traverses the block chain ledger chronologically from the previous point in time (found in step 712) forward, and computing a value of each asset that is sent or received in each transaction traversed.

In some embodiments, the companion database 103 stores metadata associated with one or more of the transactions. For example, in the case where the companion database is used to pre-confirm a POS purchase involving a block chain tracked asset, the POS terminal 122 can provide metadata associated with the transaction to the companion DBMS.

The metadata may include private data that users to not want to record in the public block chain ledger. In some embodiments, the companion database is privately owned, operated and maintained by a central authority, and access to the data in the companion database 103 is restricted. For example, the central authority can limit query access to merchants who accept POS sales using the digital currency tracked in the block chain, thus preserving the privacy and anonymity of block chain users. In some embodiments, the central authority receives the requests and acts as a filter, and only submits limited types of queries to the companion database on behalf of a limited set of entities.

In some embodiments, the companion database 103 contains the address of the asset (e.g., account) owner, the account state (balance), and the transaction ID of the last transaction affecting the account which is reflected in the balance. In the case where a query requests the balance of the account having a given address, the companion database provides the balance and the transaction ID of the last transaction. That information is sufficient to allow a merchant to approve or deny a payment by a buyer from the account. For additional information about the transaction, the merchant can go to the block chain, using the transaction ID.

In some embodiments, the companion DBMS 101 has a background process that populates additional data fields upon receipt of a new block in the block chain. The companion DBMS 101 can add the date stamp and block number corresponding to where each transaction is stored into the account record in the companion database 103, to make searching the block chain for a given transaction even faster.

FIG. 11 shows another example of a set of records related to one account (or wallet) in a companion database containing additional data fields. As discussed above, each account has data 1111 including account data 1102 and transaction data 1104-1108. The account data include an address and an account balance. Additionally for each transaction in which the address corresponding to the account is the source address or the destination address, an additional transaction data record 1104-1108 specifies: a transaction identification (ID) number, source address, designation address, date stamp and block number of the block where the transaction is recorded, and the status of the account at the time when that transaction was applied.

In addition, the record can have metadata tags 1112, such as whether the transaction was valid or invalid, a merchant identification, and/or a geographic region.

In some embodiments, a merchant can use the metadata tags in deciding whether to accept a proffered payment from a buyer's account. For example, the merchant may query the companion database and determine that an account from which the buyer wishes to transfer a payment has adequate funds, but the account also has several other transactions tagged as invalid. This can be an indication that the account has been used in double spending or that the account has been compromised. The merchant may choose to deny the transaction based on that information.

In another example, the merchant's employee may query the companion database and learn that there has been a series of recent invalid transactions involving the same digital currency at the same merchant or at various stores operated by various merchants in the same geographic region. Either case can be an indication that the account has been compromised. The merchant may choose to deny the transaction based on that information.

Because of its private nature and limited access, the companion database 103 is an advantageous way to store additional data about accounts, transactions and the parties to the transactions, without making the additional data publically available.

Some miners decide which transaction to process next using a first-in-first-out (FIFO) queue. Some miners select the next transaction to process based on transaction fees, with priority given to transactions that are older than a threshold amount of time. In some embodiments, one or more miners use data and/or metadata in the companion database 103 to change the order in which transactions are processed. For example, the companion database 103 can identify to at least one of the block chain peer processors a group of transactions that have not yet been confirmed in the block chain ledger and share a common metadata tag, such as a sender address or merchant tag.

Figure 8:
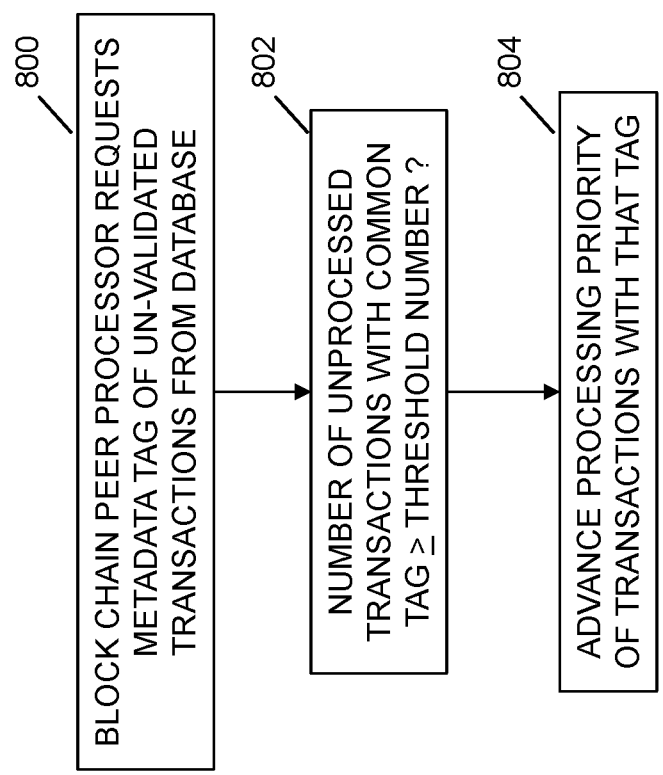
FIG. 8 is a flow chart of a method of using metadata tags stored in the companion database to prioritize processing of transactions by a block chain peer processor of FIG. 1.

FIG. 8 shows an example in which block chain peer processors 124, 128, 132 use the metadata tags to determine the order in which they will process unconfirmed transactions. For example, one of the metadata tags can identify the sender address. A miner can query all of the unprocessed transactions sent from the account having that same address. Using this information, the miner can choose to give processing priority to any transaction transferring digital currency from the same address, so as to more quickly detect double spending.

In another embodiment, the miners can query the companion database to find unprocessed transactions involving a particular merchant, as indicated in the metadata, and give priority to transactions involving that specific merchant. In the case where miners make all of their processing fees from transaction processing (and are not rewarded with new digital currency for every block generated, a merchant can offer miners a premium for giving prioritized processing to groups of that merchant's transactions.

At step 800 of FIG. 8, one of the block chain peer processors 124, 128, 132 requests a metadata tag of an un-confirmed transaction from the companion database.

At step 802, the block chain peer processor requests transaction ID numbers of any other un-confirmed transactions having the same merchant tag.

At step 804, in the case where the number of unprocessed transaction having the same merchant tag is greater than or equal to a threshold number, the block chain peer processor advances the processing priority of the transactions having that merchant tag. Each transaction may be tagged with an status level, or may have a bounty associated with each transaction, this will become more prevalent as the mining block rewards tend to 0, this bounty will be used to incentivize miners to process certain transaction in a faster format, and having an authority offer the bounty may help to increase the guarantee of payment which may be used for this purpose.

Figure 9:
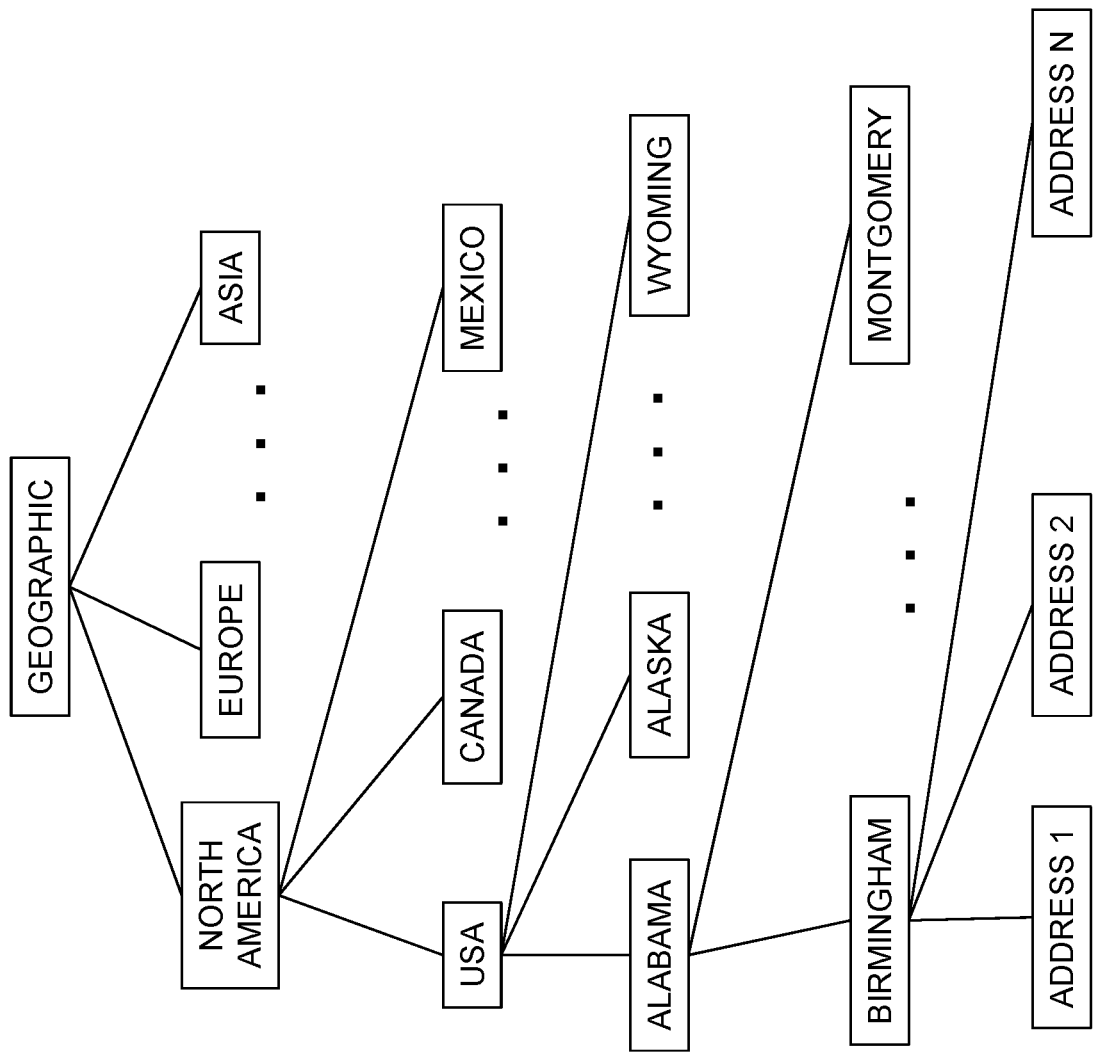
FIG. 9 is a schematic diagram of a tree structure for a companion database optimized for searching by geographic region according to some embodiments.

FIG. 9 shows an example of a tree structure for a companion database including metadata tags identifying a geographic location. In some embodiments, the geographic location is associated with the location of the retail store in which the buyer tendered payment by transfer of at least a portion of one of the block chain assets. The companion DBMS uses the geographic location tag for indexing and searching the companion database 103. The metadata tags allow rapid traversal of the companion database to locate leaves associated with a specific location, such as a specific city.

Figure 10:
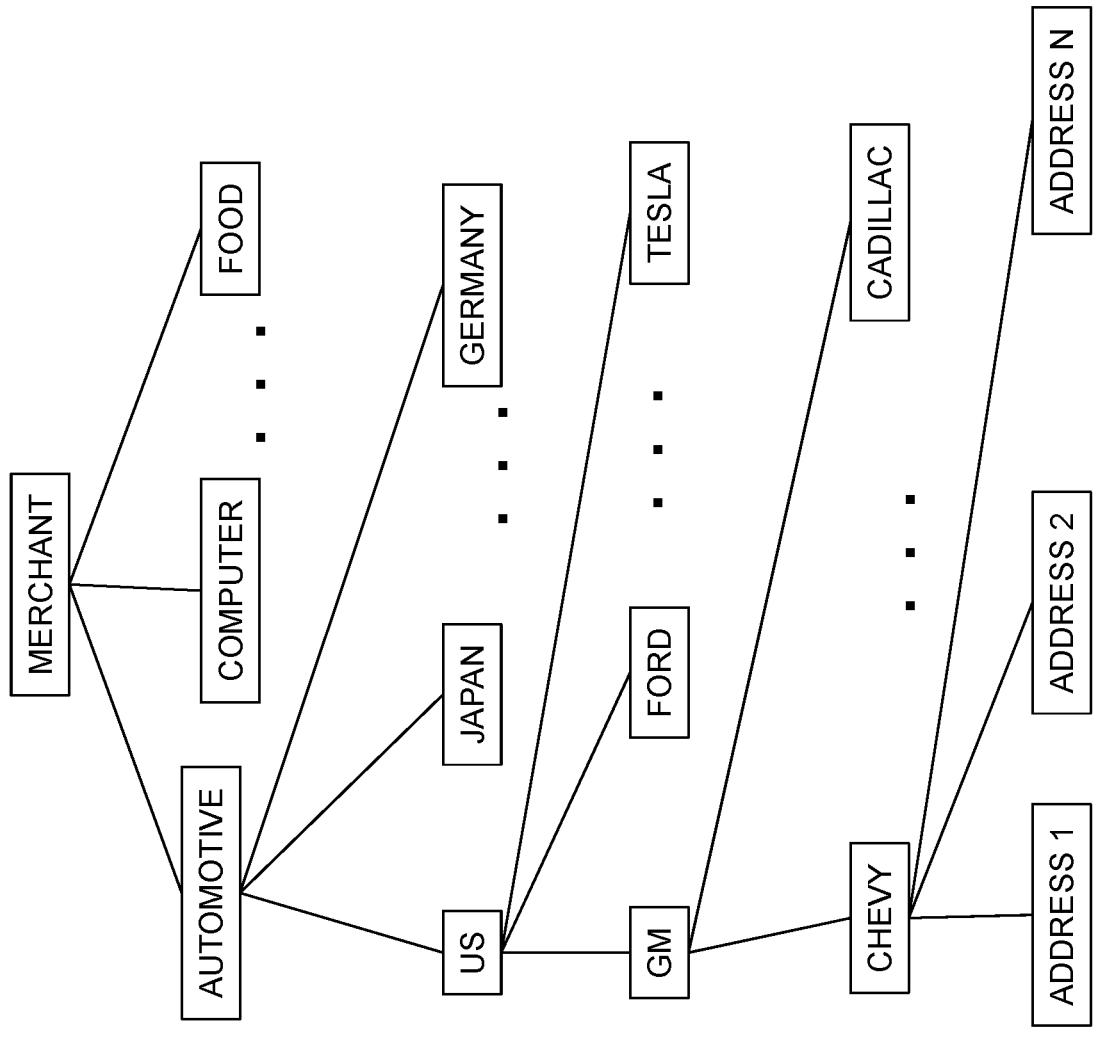
FIG. 10 is a schematic diagram of a tree structure for a companion database optimized for searching by merchant according to some embodiments.

FIG. 10 shows an example of a tree structure for a companion database including metadata tags identifying a group of automobile dealerships. In some embodiments, the metadata tags allow rapid traversal of the companion database to locate leaves associated with a specific country's dealerships, a specific corporation's dealerships, or a specific line's dealerships. The companion DBMS uses the auto line tag for indexing and searching the companion database 103.

In other embodiments, the companion database 103 is organized as an array, or as a set of linked tables.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The storage medium can include a single storage device or a plurality of storage devices, and a database or programmed stored in the medium can be stored in a single device or divided among a plurality of devices. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:
a non-transitory machine readable storage medium storing a database identifying a plurality of assets, the storage medium further storing a set of computer program instructions; and
a processor coupled to the storage medium, the processor executing the computer program instructions to perform the steps of:
receiving ledger data from at least one of a plurality of peer systems, the peer systems being in communication with the system across a communications network, and the ledger data comprising one or more ledger blocks of a distributed electronic ledger maintained at the peer systems;
based on the ledger data, generating first elements of asset data associated with corresponding ones of the assets, and storing the first elements of asset data within the database;
receiving a plurality of updates to the distributed electronic ledger maintained at the peer systems, each of the plurality of updates including an event affecting a respective one of the assets;
computing a respective state of each of the assets based on a corresponding one of the updates, and storing the computed states within the database;
receiving, from a device across the communications network, a request for the state of a selected one of the assets; and
generating and transmitting, to the device across the communications network, a response to the request that includes the state of the selected asset, the response being generated and transmitted to the device prior to a recordation of the update associated with the selected asset onto the distributed electronic ledger by the peer systems.

2. The system of claim 1, wherein the system corresponds to a hierarchical database management system, and the database is organized according to a tree structure.

3. The system of claim 2, wherein the distributed electronic ledger comprises a block chain ledger, and the first element of asset data associated with each respective one of the plurality of assets comprises:

an address of a recipient of at least a portion of the respective asset;
an update identifier of a recent one of the plurality of updates that affects the respective asset;
the state of the respective asset reflects an application of the recent one of the plurality of updates to the respective asset;
a date stamp of the recent one of the plurality of updates affecting the respective asset, and
a block number of a ledger block of the block chain ledger that records the recent one of the plurality of updates affecting the respective asset.

4. The system of claim 3, wherein:
the respective asset includes a digital currency account;
the state includes a balance of the digital currency account reflecting at least one of the updates that affect the digital currency account; and
the device comprises a point-of-service terminal,
wherein the point-of-service terminal is programmed to authorize a purchase transaction when the balance is greater than or equal to a transaction amount associated with the purchase, and to decline the purchase transaction when the balance is less than the transaction amount.

5. The system of claim 3, wherein:
the respective asset includes an additional device device that stores an application program within a corresponding memory;
the state includes a current version of the application program stored in the additional device; and
the device comprises an application server, and the request includes a request from the application server for identification of a version of the program installed in the additional device,
wherein the application server is programmed to download the new version of the program to the additional device when the current version is a prerequisite version, and the application server is programmed to download the prerequisite version of the program to the additional device when the current version is not the prerequisite version.

6. A non-transitory machine readable storage medium storing a set of computer program instructions that when executed by a processor, cause the processor to perform a method comprising:
receiving ledger data from at least one of a plurality of peer systems, the peer systems being in communication with the database management system across a communications network, and the ledger data comprising one or more ledger blocks of a distributed electronic ledger maintained at the peer systems;
based on the ledger data, generating first elements of asset data associated with corresponding ones of the assets, and storing the first elements of asset data within a database of a database management system;
receiving a plurality of updates to the distributed electronic ledger maintained at the peer systems, each of the plurality of updates including an event affecting a respective one of the assets;
computing a respective state of each of the assets based on a corresponding one of the updates, and storing the computed states within the database;
receiving, from a device across a communications network, a request for the state of a selected one of the assets; and
generating and transmitting, to the device across the communications network, a response to the request that includes the state of the selected asset, the response being generated and transmitted to the device prior to a recordation of the update associated with the selected asset onto the distributed electronic ledger by the peer systems.

7. A computer-implemented method comprising:
receiving, by at least one processor of a database management system, ledger data from at least one of a plurality of peer systems, the peer systems being in communication with the database management system across a communications network, and the ledger data comprising one or more ledger blocks of a distributed electronic ledger maintained at the peer systems;
based on the ledger data, generating, by the at least one processor, first elements of asset data associated with corresponding ones of the assets, and storing the first elements of asset data within a database maintained by the database management system;
receiving, by the at least one processor, a plurality of updates to the distributed electronic ledger maintained at the peer systems, each of the plurality of updates including an event affecting a respective one of the assets;
by the at least one processor, computing a respective state of each of the assets based on a corresponding one of the updates, and storing the computed states within the database;
receiving, by the at least one processor, and from a device across the communications network, a request for the asset state of a selected one of the assets; and
by the at least one processor, generating and transmitting, to the device across the communications network, a response to the request that includes the state of the selected asset, the response being generated and transmitted to the device prior to a recordation of the update associated with the selected asset onto the distributed electronic ledger by the peer systems.

8. The computer-implemented method of claim 7, wherein the database management system corresponds to a hierarchical database management system, the database is organized in accordance with a tree structure, and the distributed electronic ledger includes a block chain ledger.

9. The computer-implemented method of claim 7, wherein:
the selected asset includes a digital currency account;
the state of the respective asset comprises a balance of the digital currency account, the balance reflecting at least one of the updates that affects the digital currency account;
the method further comprises obtaining, by the at least one processor, the balance of the digital currency account from the database, the balance being obtained prior to the recordation of the at least one of the updates onto the distributed electronic ledger by the peer systems; and
the response comprises the balance of the digital currency account.

10. The computer-implemented method of claim 7, wherein the state of each asset is a respective current value of each respective asset, and wherein the first element of asset data for each asset comprises the current value of each asset and an address associated with each asset.

11. The computer-implemented method of claim 7, wherein:
the ledger data comprises a plurality of ledger blocks recorded sequentially onto the distributed electronic ledger by the peer systems, each of the ledger blocks comprising corresponding temporal data; and
the computer-implemented method further comprises:
obtaining, by the at least one processor, a first hash value associated with the database from a first one of the ledger blocks;
computing, by the at least one processor, a local hash value representative of the first elements of asset data and the states maintained within the database; and
determining that the local hash value fails to match the first hash value.

12. The computer-implemented method of claim 11, further comprising:
based on the determination that the first hash value fails to match the local hash value, obtaining, by the at least one processor, a second hash value associated with the database from a second one of the ledger blocks;
determining, by the at least one processor, that the second hash value matches the local hash value;
by the at least one processor, determining a recordation time associated with the second ledger block based on the corresponding temporal data, and identifying a subset of the ledger blocks recorded onto the distributed ledger prior to the second ledger block, the subset of the ledger blocks comprising the second ledger block; and
by the at least one processor, generating second elements of asset data associated with the assets based on the subset of the ledger blocks, and storing the second elements of asset data within the database, the second elements of asset data replacing at least the first elements of asset data within the database.

13. The computer-implemented method of claim 7, wherein the database further includes metadata associated with each of the assets, and the computer-implemented method further comprises:
identifying, by the at least one processor, and based on the metadata, a subset of the updates associate with corresponding assets that share a common metadata tag; and
by the at least one processor, transmitting the subset of the updates across the communications network to the peer systems.

14. The computer-implemented method of claim 7, wherein:
the distributed electronic ledger comprises a block chain ledger tracking a plurality of digital currency accounts, each asset comprising a respective one of the digital currency accounts;
the state of each asset includes a balance of the respective digital currency account; and
the events include one of creation of an amount of digital currency and transfer of digital currency from an account associated with a first address to an account associated with a second address.

15. The computer-implemented method of claim 7, wherein the request comprises a request from a merchant for validation of a purchase transaction involving a digital currency account, and wherein the generated response identifying a double-spend condition of the digital currency account.

16. The computer-implemented method of claim 7, wherein each asset includes an additional device that stores and executes an application program having a corresponding program version, the distributed electronic ledger stores the corresponding program versions for the additional devices, and the request comprises a request for the corresponding program version of the application program executed by the selected asset.

17. The computer-implemented method of claim 11, further comprising:
storing, by the at least one processor, the ledger data within a storage medium of the database management system;
receiving, by the at last one processor, additional ledger data from at least one of the peer systems, the additional ledger data comprising an additional ledger bock of the distributed electronic ledger;
by the at least one processor, obtaining a first state of a corresponding one of the assets from the additional ledger data, and obtaining a second state of the corresponding asset from the database; and
by the at least one processor, obtaining the first hash value and computing the local hash value when the first state is inconsistent with the second state.

18. The computer-implemented method of claim 7, wherein the storing comprises storing, for each of the assets, the computed state within a portion of the database that includes the corresponding first element of asset data.

19. The system of claim 1, wherein:
the ledger data comprises a plurality of ledger blocks recorded sequentially onto the distributed electronic ledger by the peer systems, each of the ledger blocks comprising corresponding temporal data; and
the processor is further configured to execute the computer program instructions to perform the step of storing the ledger data within the storage medium.

20. The system of claim 19, wherein the processor is further configured to execute the computer program instructions to perform the steps of:
obtaining a first hash value associated with the database from a first one of the ledger blocks within the stored ledger data;
computing, by the at least one processor, a local hash value representative of the first elements of asset data and the states maintained within the database; and
determining that the local hash value fails to match the first hash value.

21. The system of claim 20, wherein the processor is further configured to execute the computer program instructions to perform the steps of:
based on the determination that the first hash value fail to match the local hash value, obtaining a second hash value associated with the database from a second one of the ledger blocks within the stored ledger data;
determining that the second hash value matches the local hash value;
determining a recordation time associated with the second ledger block based on the corresponding temporal data, and identifying a subset of the ledger blocks recorded onto the distributed ledger prior to the second ledger block, the subset of the ledger blocks comprising the second ledger block; and
generating second elements of asset data associated with the assets based on the subset of the ledger blocks, and storing the second elements of asset data within the database, the second elements of asset data replacing at least the first elements of asset data within the database.

22. The system of claim 20, wherein the processor is further configured to execute the computer program instructions to perform the steps of:

receiving additional ledger data from at least one of the peer systems, the additional ledger data comprising an additional ledger bock of the distributed electronic ledger;

obtaining a first state of a corresponding one of the assets from the additional ledger data, and obtaining a second state of the corresponding asset from the database; and obtaining the first hash value bad computing the local hash value when the first state is inconsistent with the second state.

23. The system of claim 1, wherein:

the database further includes metadata associated with each of the assets;

the processor is further configured to execute the computer program instructions to perform the steps of:

identifying, based on the metadata, a subset of the updates associate with corresponding assets that share a common metadata tag; and transmitting the subset of the updates across the communications network to the peer systems.

* * * * *